United States Patent [19]
Urayama

[11] 3,920,910
[45] Nov. 18, 1975

[54] AUTOMATIC TELEPHONE ANSWERING APPARATUS

[75] Inventor: Yuji Urayama, Yokohama, Japan

[73] Assignee: Victor Company of Japan, Ltd., Yokohama, Japan

[22] Filed: May 15, 1974

[21] Appl. No.: 470,012

[30] Foreign Application Priority Data

May 17, 1973 Japan ............................... 48-54058

[52] U.S. Cl. ................................ 179/6 R; 179/6 R
[51] Int. Cl. ............................................ H04m 1/64
[58] Field of Search ......................... 179/6 AC, 6 R

[56] References Cited

UNITED STATES PATENTS

| | | | |
|---|---|---|---|
| 3,337,690 | 8/1967 | Martin | 179/6 R |
| 3,344,234 | 9/1967 | Salzberg et al. | 179/6 R |
| 3,445,600 | 5/1969 | Todd | 179/6 R |
| 3,501,592 | 3/1970 | Waldman | 179/6 R |
| 3,721,765 | 3/1973 | Ho | 179/6 R |
| 3,728,488 | 4/1973 | Bonsky et al. | 179/6 R |
| 3,729,589 | 4/1973 | Bonsky et al. | 179/6 R |
| 3,818,141 | 6/1974 | Jacobson | 179/6 R |

*Primary Examiner*—Vincent P. Canney
*Attorney, Agent, or Firm*—Owen, Wickersham & Erickson

[57] ABSTRACT

An automatic telephone answering apparatus has a circuit for generating repeated signals of a specific duty factor in response to the arrival of a call signal and a circuit operating when it has received a predetermined number of the output repeated signals of the first circuits to cause answering means to begin transmitting an answering message, the apparatus thus starting answering operation always after elapse of a predetermined time from the instant of arrival of the call signal irrespective of the kind of the duty factor of the call signal. Furthermore, the apparatus is so adapted that the answering operation is not started when the receiver of the telephone set of the called party is lifted off its cradle before the above mentioned specific number of repeated signals are received.

9 Claims, 5 Drawing Figures

AUTOMATIC TELEPHONE ANSWERING APPARATUS

BACKGROUND OF THE INVENTION

The present invention relates to an automatic telephone answering apparatus and more particularly to an automatic telephone answering apparatus which assumes an answering operational state upon the arrival of a predetermined number of call signals irrespective of the kind of the call signals and, furthermore, does not assume the answering state when the receiver of the telephone coupled thereto is lifted off its cradle during the reception of the predetermined number of call signals but permits ordinary telephone communication.

In general, in an automatic telephone answering and recording apparatus, a call answering apparatus operates in response to a call signal. Call answering apparatuses for this purpose known heretofore may be broadly divided into those of the charging-discharging type and those of the holding type. In a charging-discharging type answering apparatus, a voltage is impressed on a capacitor by way of a relay contact point which opens and closes in synchronism with an incoming call signal, whereby the capacitor is charged, and when the voltage between the terminals of this capacitor rises to a predetermined value, the apparatus accomplishes answering.

In some areas, however, conditions differ with telephone companies. For example, in the U.S.A., there are different telephone companies such as the Bell Telephone Company and the General Telephone Company, and the duty factor of the call signal differs with each telephone company. Consequently, in an answering apparatus of the above described charging-discharging type known heretofore, the charging time differs with the call signal of each telephone company. For this reason, the voltages of the above mentioned capacitors thus charged differ with the call signals of the different telephone companies before these voltages can reach predetermined values. As a consequence, the number of repeated call signals required from the arrival of a call signal to the start of answering of the answering apparatus differs with each telephone company. This has been a problem accompanying known telephone answering apparatuses of the charging-discharging type.

On the other hand, in an answering apparatus of the holding type, a holding circuit is held in its operative state by the arrival of a call signal and thus operates to charge a capacitor, and when the terminal voltage of this capacitor rises to a predetermined value, the apparatus accomplishes answering.

In the case of this known holding type answering apparatus, the time from the arrival of a call signal to the start of answering is constant even in the case where the duty factor of the call signal differs. However, once a call signal arrives, telephone conversation becomes impossible even when the receiver of the telephone set is lifted before the apparatus assumes the answering state, and the answering operation is carried out after the elapse of the above mentioned constant time. This has been a problem accompanying the holding type answering apparatus known heretofore.

SUMMARY OF THE INVENTION

Accordingly, it is a general object of the present invention to provide a novel and useful automatic telephone answering apparatus.

A specific object of the invention is to provide an automatic telephone answering apparatus operating in response to the arrival of a call signal to start an answering operation always after a constant number of repeated call signals from the instant of arrival of the call signal even in cases where the kind of call signal differs and the duty factor thereof differs.

Another object of the invention is to provide an automatic telephone answering apparatus in which, when the receiver of a telephone set coupled to the apparatus is lifted off its cradle after the arrival of a call signal but before the apparatus starts its answering operation, the apparatus assumes a state permitting ordinary telephone communication and is thereafter prevented from assuming its answering state.

Other objects and further features of the invention will be apparent from the following detailed description when read in conjunction with the accompanying drawings.

DETAILED DESCRIPTION

Figure 1:
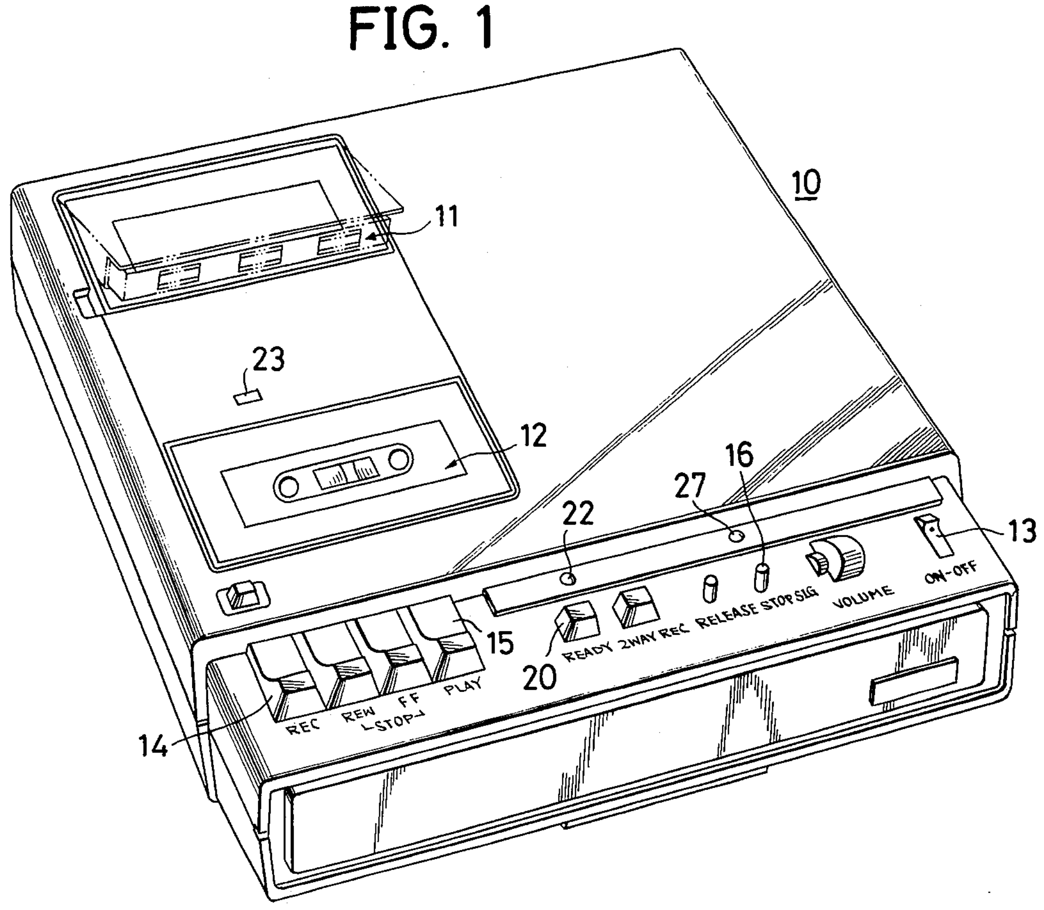
FIG. 1 is a perspective view showing the exterior of the top, front, and left side of one example of an automatic telephone answering and recording apparatus according to the invention.
Figure 2A:
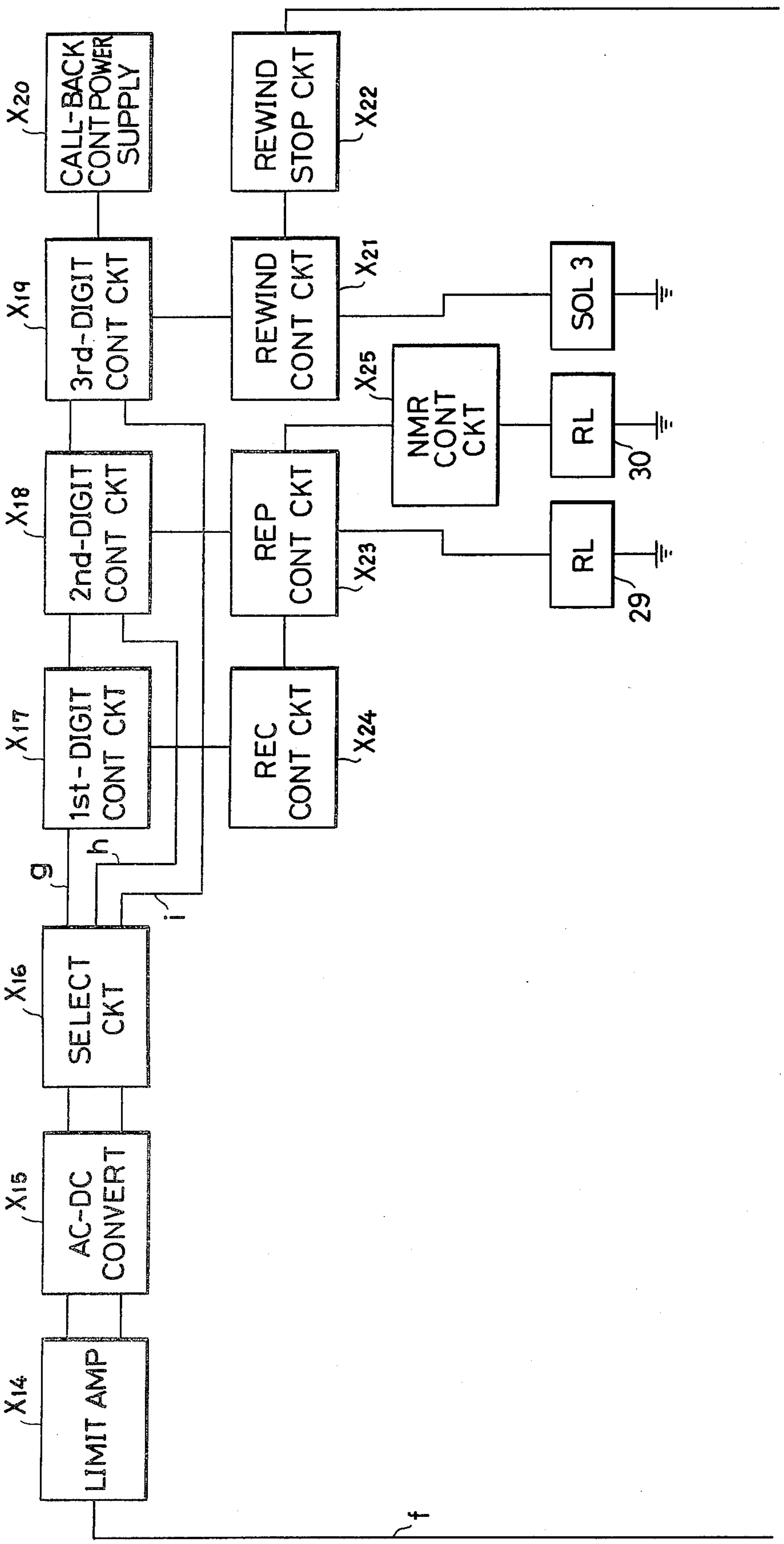
FIGS. 2A and 2B are block diagrams showing the circuit organization of the first embodiment of the apparatus shown in FIG. 1.
Figure 2B:
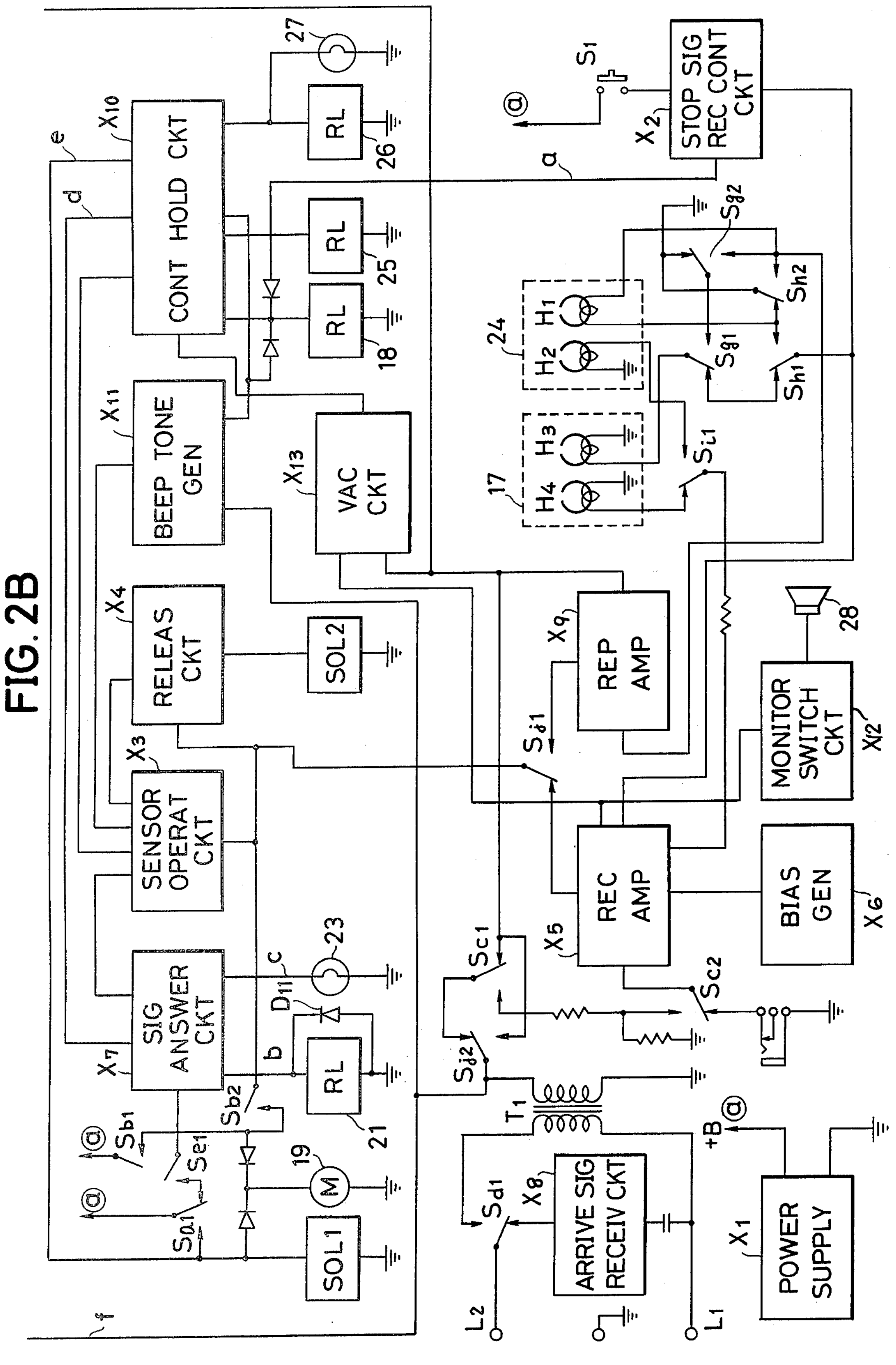

First, the operation of an automatic telephone answering and recording apparatus 10 in which a signalling answering circuit, constituting an essential part of the device of this invention, will be described in outline form in conjunction with FIGS. 1, 2A and 2B. In the automatic telephone answering and recording apparatus 10 (hereinafter referred to simply as apparatus), an endless-tape cassette 11, on which a required outgoing message has previously been recorded and a still unrecorded cassette 12 having finite ends for recording incoming messages are inserted in respective loading positions.

When a power supply switch 13 is switched on, a power supply circuit X1 is activated, and a DC voltage is supplied to the circuits described hereinafter. Then, a recording button 14 and a playing (reproducing) button 15 are pushed down, and a stop signal recording button 16 is further depressed, whereupon a switch S1 is closed, and a stop signal recording controlling circuit X2 operates for a predetermined time. An oscillation output from the circuit X2 passes through relay contact points $Sh1$ and $Sg1$ and is supplied to a playing head H3 for incoming messages of a head assembly 17 for the incoming message side.

Furthermore, the output of the circuit X2 passes through a line *a* and is applied to and activates a control relay 18 on the incoming message recording side, whereby relay contact points S*b*1 and S*b*2 are closed. Consequently, the output of the circuit X1 passes through the relay contact points S*b*1 and S*b*2 and is applied to and activates a sensor operating circuit X3. The output of this circuit X3 activates a release circuit X4, whereby a solenoid SOL2 of the incoming message recording side is activated. Furthermore, a DC motor 19 for driving at the same time a capstan provided in the vicinity of the incoming message recording and answering cassettes is started.

In addition, the output from the circuit X1 is applied by way of the relay contact points S*b*1, S*b*2, and S*j*1 to a recording amplifying circuit X5 and a bias generating circuit X6. As a consequence, the cassette tape of the incoming message recording cassette 12 is clamped between and driven by a pinch roller and the capstan (both not shown). At the same time, the output signal of the circuit X2 is recorded as a stop signal for a specific time (approximately 10 seconds) on this tape by the incoming message recording head H3.

Upon completion of this recording of the stop signal, the ready button 20 is depressed, whereupon a relay contact point S*e*1 is closed, and the output of the circuit is supplied to and activates a signalling answering circuit X7. Consequently, an answering relay 21 is activated, and its relay contact point S*a*1 is changed, whereby the relay is self held. Accordingly, an answering side solenoid SOL1 and the motor 19 are operated, and the endless tape within the answering cassette 11 is clamped and driven by the pinch roller and capstan. When, during the travel of the endless tape, a sensor (not shown) detects a sensing foil bonded at a specific position of the tape, the circuit X3 operates to generate pulse signals, which are supplied to the above mentioned answering circuit X7. As a consequence, the relay contact point S*e*1 is opened, and the relay 21 is rendered inoperative. Similarly, both the solenoid SOL1 and the motor 19 are rendered inoperative. Accordingly, the endless tape is stopped in a state wherein it has been made ready for new recording. In this state, a ready lamp 22 is lit to indicate that the apparatus 10 has assumed its ready mode.

The operation in the case when, in this mode of operation, a signal arrives will now be described. When a signal arrives at connection terminals L1 and L2 with the telephone line, this signal flows through a closed circuit of from the terminal L2 and through a relay contact point Sd1, an arriving signal receiving circuit X8, a capacitor, and the terminal L1, whereby the circuit X8 is activated. The signalling answering circuit X7, constituting an essential and important part of the present invention, operates as described hereinafter intercoupledly with the operation of this circuit X8 to output signals through lines *b*, *c*, and *d*.

The signal through the line *b* is supplied to the relay 21, which is thereby activated and is self held in its operative state. The signal through the line *c* is supplied to a signal arrival lamp 23, which is thereby lit and is self held in this state. Therefore, the solenoid SOL1 and the motor 19 are placed in their operative states as described above, and, further, a reproduction amplification circuit X9 is rendered operative.

Moreover, the signal from the circuit X7 through the line *d* is supplied to a control holding circuit X10, which is thereby rendered operative. The circuit X10 is successively supplied with the signal through a line *e*, interrelated with the switchover operation of a relay contact point Sa1 caused by the operation of the relay 21, and is self held in its operative state. The operation of the circuit X10 causes a relay 26 and an operation lamp 27 to be operated. As a result particularly of the relay 26, a relay contact point Sd1 is switched, whereby the apparatus 10 is connected to the telephone line. Moreover, the lit state of the lamp 27 indicates that the apparatus 10 is operating.

Consequently, the endless tape on the answering side which is in the ready mode starts to travel, and playing of the answering message is carried out by a recording-/reproducing head H1 incorporated within an answering head assembly 24. The resulting reproduced signal from the head H1 is supplied to an amplifier by the amplification circuit X9, and the resulting output signal thereof passes through relay contact points S*c*1 and S*j*2 and passes further through a coupling transformer T1. Then, this signal passes through the relay contact point Sd1 switched and connected as described below and the terminal L2 and is sent to the telephone line as an answering message conveying information relating to the absence of the called person to the person making the call (hereinafter referred to as the telephone caller).

When the outgoing message containing information relating to the absence of the called person has been sent, and the endless tape within the cassette 11 has made one cycle of travel to bring the sensing foil to the position of the sensor, the sensor operating circuit X3 operates similarly as mentioned above, and the output signal therefrom is supplied to the circuits X7 and X10 and to a beep-tone generating circuit X11, whereupon the circuit X7 is rendered inoperative, the circuit X10 is activated as a recording state, and the circuit X11 is activated. The output signal of the circuit X11 is sent by way of the transformer T1 to the telephone line side and is sent as a beep tone to the telephone caller.

As another result of the non-operation of the circuit X7, the self holding state of the relay 21 is terminated, and the solenoid SOL1 is rendered inoperative. The travel of the endless tape is again stopped at the ready position for recording. Furthermore, as a result of the above described operation of the circuit X10, the relay 20, together with the relay 18, are held in their operative states, and the relay contact points S*c*1, and S*c*2 are newly changed over. As a result, the motor 19 continues to rotate, and the solenoid SOL2 newly operates. The cassette tape of the cassette 12 on the incoming message recording side starts to travel, and the apparatus 10 assumes the state for recording the incoming message.

Then, the audio signal of the incoming message sent from the telephone caller is transmitted through the telephone line and arrives at the terminal L2 and is thence transmitted by way of the relay contact point Sd1 and the transformer T1. This signal is further transmitted through the relay contact point S*j*2 and relay contact points S*c*1 and S*c*2 in changed over state to the recording amplification circuit X5. The amplified voice signal from the circuit X5 is supplied by way of relay contact points Sh1 and Sg1 to the recording/reproducing head H3 of the head assembly 17. At the same time, a bias current from the bias generating circuit X6 is supplied to the head H3, and the content of the message spoken by the telephone caller is recorded on the still unrecorded cassette tape of the cassette 12.

Furthermore, the output of the circuit X5, is supplied to a voice activity control (VAC) circuit X13 producing as output a DC signal in accordance with the existence or nonexistence of an input signal. The output of the circuit X13 is applied to the control holding circuit X10, which is thereby held in its operative state, and the apparatus 10 is held in the mode for recording an incoming message. By controllably activating the monitor switching circuit X12 at this time, it is possible by means of a loudspeaker 28 to monitor the content of the incoming message from the caller, which message is being recorded at the moment.

When the telephone caller has completed his oral statement of his message and has replaced the telephone receiver on its cradle (i.e., has "hung up"), the circuiit X5 stops sending an output signal to the VAC circuit X13, the output signal of which is reduced to zero after approximately 10 seconds. Consequently, the circuit X10 is rendered inoperative, and the operations of the relays 18, 25, and 26 are terminated. The motor 19 and the solenoid SOL2 are both rendered inoperative, whereby the apparatus is uncoupled from the telephone line and is restored to its original ready state. While the lamp 27 is extinguished at this time, lamps 22 and 23 continue to be lit to indicate that there has been an arriving signal at the apparatus 10.

Next, the operation of the apparatus 10 in the case of remote control thereof through the telephone line will be described. The apparatus 10 has three selectors (not shown) which are provided in specific positions and are adjustably set to selectively detect pair tones respectively composed of high tones and low tones generated when, at a remote calling point, the numeral buttons from zero to 9 of a so-called touch-tone telephone set are depressed in predetermined sequences.

When the owner of the apparatus 10 sends a call signal from a remote point to the telephone set connected to the apparatus 10, the apparatus 10 operates in the same manner as in the case described above. The endless tape on the answering side is driven through one cycle of travel, transmitting the answering message and the beep tones to the caller. Thereafter, the apparatus 10 assumes the ready state for recordings.

When, with the apparatus 10 in this mode, the owner successively sends signals of three predetermined digits, these signals are transmitted through the telephone lines L1 and L2 to the apparatus 10. These three-digit signals are thereupon transmitted by way of the transformer T1 to the apparatus 10, by way of the transformer T1 to the apparatus 10, by way of a line *f* to a limiter amplifying circuit X14 to be amplified, and are then supplied to an AC to DC conversion circuit X15. In this circuit X15, high tones and low tones are selected, and in accordance with the combinations thereof, numerals of from zero to 9 are read. The circuit X15 comprises a plurality of band-pass filters, amplification circuits, rectification circuits, DC amplification circuits, and other components.

The AC to DC conversion circuit X15 produces output signals, which are suitably combined in groups of three or four and supplied to a selector circuit X16 of the succeeding stage. From this circuit X16, signals of the first, second, and third digits are respectively supplied through line *g*, *h*, and *i* to a first-digit control circuit X17, a second-digit control circuit X18, and a third-digit control circuit X19.

When the output signal of the circuit X16 appears in the line *g*, the circuit X17 is activated, and an output signal from the circuit X17 is continuously applied to the circuit X18 for approximately 5 seconds. When, during this period, an output signal from the circuit X16 appears in the line *h*, the circuit X18 is activated, and an output signal from the circuit X18 is continuously applied to the circuit X19 for approximately 5 seconds. When the output signal of the circuit X16 is supplied through the line *i* to the circuit X19 during the output signal of the circuit X18 being supplied to the circuit X19, the circuit X19 is activated and the output signal of the circuit X19 is supplied to the call-back controlling power supply circuit X20. The circuit X20 operates after the signal from the circuit X19 stops arriving to supply a voltage to the above mentioned circuits X17, X18, and X19, which thereafter are placed in modes for operating independently in accordance with the arrival of their corresponding digit signals.

When the signals of the three digits successively arrive as mentioned above, the output signal of the circuit X19 activates a rewind control circuit X21, and the solenoid SOL2 on the incoming message recording side is rendered inoperative, whereby the pinch roller ceases to press against the capstan. At the same time, a solenoid SOL3 for driving the rewind mechanism is rendered operative. As a consequence, rewinding of the tape within the cassette 12 on the incoming message recording side is carried out. At the same time, a relay 29 for changing the apparatus 10 to the incoming message playing mode operates, and relay contact points S*g*1, S*g*2, S*j*1, and S*j*2 are respectively switched.

During this rewinding operation, furthermore, the head assembly 17 is lightly contacting the tape which is traveling at high speed. Accordingly, the signal reproduced by the head H3 is applied by way of the relay contact points S*g*1 and S*g*2 to the reproduction amplification circuit X9. The output of this circuit X9 is transmitted by way of the relay contact point S*j*2 and the transformer T1 to the telephone line side, and an audio signal confirming the fact that rewinding is being carried out is sent to the caller at the remote point. The output of the circuit X9 is simultaneously applied to a rewind stopping circuit X22.

The rewinding is carried out to the part where the above mentioned stop signal is recorded. When the head H3 reproduces a stop signal, the circuit 22 is activated, and the rewind control circuit X21 is rendered inoperative. Consequently, the solenoid SOL3 is rendered inoperative, and the rewinding operation stops.

When the circuit X21 is rendered inoperative, the solenoid SOL2 for driving operates, and the cassette tape for message recording is clamped between and driven by the pinch roller and the capstan. Furthermore, a reproduction control circuit X23 is rendered operative by the above mentioned stop signal, and the apparatus is changed to a mode for playing back the recorded incoming message. As a result, the incoming message recorded on the cassette tape for recording incoming messages is transmitted to the owner of the apparatus 10 calling from the remote point.

The control actions and operations which can be carried out by the operator will now be simply described. When, during the above described rewinding operation, the signal of the second digit is sent, the circuit X21 is rendered inoperative, and the apparatus 10 is converted from the rewind mode to the reproducing or playback mode. Furthermore, when the owner sends a signal of the first digit for a short time during the playback operation, the circuit X17 operates and produces an output signal whereby a recording controlling circuit X24 operates, and the circuit X23 is rendered inoperative. As a result, the apparatus 10 is caused by the owner to assume a mode wherein it can record on the tape of the cassette 12 on the incoming message side.

When the owner continues to send the signal of the above mentioned first digit over a long period (2 seconds or more), the circuit X2 operates further, and a stop signal for the tape of the cassette 12 is recorded. For this reason, it is possible to prevent erroneous erasure of the principal incoming message content in next operation by listening to this content in the incoming message cassette 12 and thereafter sending the signal of the first digit over a long period of time thereby to record newly a stop signal. When, with the apparatus in the above mentioned recording mode, the owner, who is the caller, hangs up, the VAC circuit X13 is rendered inoperative after a specific period thereafter similarly as described above, and the circuit X10 is placed in its inoperative state, the apparatus 10 thereupon being placed in the ready mode.

When, with the apparatus in the mode for reproducing the recorded incoming message, the telephone caller sends the second-digit signal, a new message recording (NMR) control circuit X25 operates, whereupon a relay 30 operates, and relay contact points S*j*1, S*h*1, and S*h*2 are switched. As a consequence, the endless tape on the answering side is driven, and, moreover, the recording/reproducing head H1 and the erasing head H2 of the head assembly 24 on the answering side are both rendered operative, whereby a new message is recorded on the endless tape on the answering side. The apparatus 10 reproduces the message thus recorded anew and transmits it to the caller, then being placed in the ready state with the tape in a state of readiness for new recording.

Furthermore, when the signal of the second digit is received with the apparatus 10 in the mode for recording an incoming message, the circuits X18 and X23 operate, and the apparatus is placed in the mode for message playback. When, with the apparatus 10 in the above mentioned message recording state, the signal of the third digit is received, the apparatus is placed in the rewinding mode while this signal is being received and is placed in the message reproducing mode after this signal is no longer received.

Next, the organization and operation of the signalling answering circuit X7, which constitutes an essential part of the present invention will be described with reference to FIG. 3 and FIGS. 4(A) through 4(F).

Figure 3:
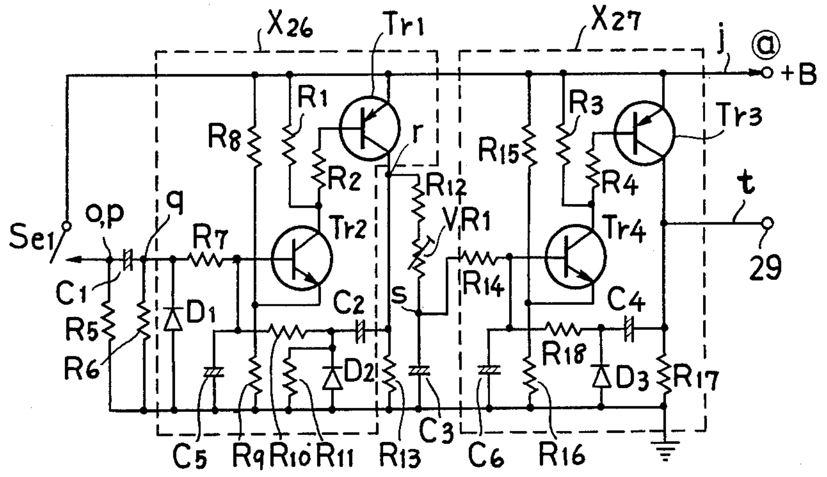
FIG. 3 is a circuit diagram of one part of an embodiment of a signalling answering circuit which constitutes an essential and important part of the present invention.

When the apparatus 10 has assumed its ready mode, as described herebefore, the power source voltage +B is supplied through a line *j*, shown in FIG. 3, whereby a first control circuit X26 for generating an output signal of a specific pulse width and a second control circuit X27 operating at a time when the input voltage reaches a predetermined value, both of which constitute a portion of the signalling answering circuit X7, are respectively placed in their operative ready states. Specifically, the power source voltage +B through the line *j*, in the circuit X26, is applied through resistors R1 and R2 to the base of a PNP transistor T*r*1, and in the circuit X27, is applied through resistors R3 and R4 to the base of PNP transistor T*r*3.

When the call signal arrives at terminals L1 and L2 for connection with the telephone line, the relay contact point S*e*1 undergoes ON-OFF operation in synchronism with the call signal. The call signals, in the U.S.A., are different in each telephone company. For instance, in the Bell Telephone Company, the call signal is a high-level signal repeated over two seconds every six seconds. In the General Telephone Company, the call signal is a high-level signal repeated over one second every six seconds, the repeated period being the same as that of the above call signal. Because the call signal is different for each telephone company in the U.S.A. as mentioned above, there arises the above mentioned problem. The automatic telephone recording and answering apparatus 10 according to the present invention, however, in view of the fact that the calling signals of all telephone companies are the same with respect to the repeated period thereof, is so organized that, as described hereinafter, the apparatus is placed in its answering operative state in response to the same number of the call signals (i.e., the same period), even in the case where the apparatus is connected to a telephone line of the Bell or the General Telephone Company.

Figure 4:
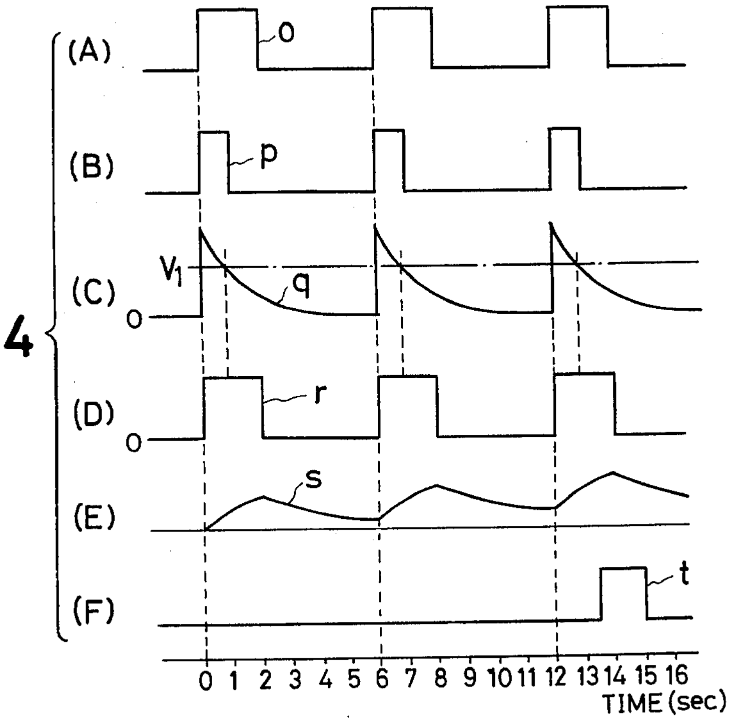
FIGS. 4(A) through 4(F) are respectively diagrams showing wave forms of voltage signals produced at respective parts of the circuit shown in FIG. 3.

When, with the apparatus 10 in a state wherein it is connected to a telephone line of the Bell Telephone Company or the General Telephone Company, a call signal arrives at the apparatus 10, and the relay contact point S*e*1 undergoes switching operation in synchronism with the call signal, a voltage signal *o* or *p* of a waveform as illustrated in FIG. 4(A) or 4(B), respectively, is generated across a resistor R5 in response to the call signal. This voltage signal *o* or *p* is differentiated at a following differentiating circuit comprising a capacitor C1 and a resistor R6, and becomes a signal *q* illustrated in FIG. 4(C).

This signal *q* is clamped by a diode D1 and applied through a resistor R7 to the base of an NPN transistor T*r*2, which is thereby rendered conductive over a period wherein the voltage signal *q* exceeds the specific voltage value V1. This voltage value V1 is determined by the voltage drop across the base and emitter of the transistor T*r*1 and the voltage obtained by dividing the power voltage +B by means of resistors R8 and R9. Moreover, the time period when the transistor T*r*2 is held in its conductive state becomes constant irrespective of the different call signals through the telephone lines of the different telephone companies. This period is equal to or shorter than the high-level period of the voltage signal which high-level period is the shortest or minimum, and is set at about 0.8 seconds.

When the transistor T*r*2 becomes conductive, the transistor T*r*1, the base of which is grounded by way of the resistor R2, the transistor T*r*2, and the resistor R9, is rendered conductive. The conductive state of the transistor T*r*1 causes a voltage to be generated across a resistor R13 connected to the collector thereof, and this voltage is applied through a capacitor C2 and a resistor R10 to the base of the transistor T*r*2, which is thereby biased further in the forward direction and held in its conductive state. The time period during which the transistors T*r*2 and T*r*1 are both placed in their conductive states is determined by the capacitor C1 and the resistors R10, R11, R8, and R9, and is set at about two seconds in the present embodiment. Accordingly, the circuit X26 produces an output signal *r* which has a high-level period over two seconds with a period of six seconds as illustrated in FIG. 4(D).

When the transistor T*r*1 is being held in its conductive state, the output signal *r* is supplied to a capacitor C3 by way of a resistor R12 and a variable resistor VR1, and the capacitor C3 is thereby charged. On the other hand, when the transistor Tr1 is in its nonconductive state, the charge of the capacitor C3 is discharged by way of the variable resistor VR1 and the resistors R12 and R13. The terminal voltage of the capacitor C3 is applied through a resistor R14 to the base of an NPN transistor Tr4.

Because the circuit is so organized that the time constant of the discharging circuit with respect to the above mentioned capacitor C3 is appropriately greater than that of the charging circuit, the terminal voltage *s* of the capacitor C3 increases gradually in response to the arrival of the incoming signal, as illustrated in FIG. 4(E). Herein, the charging and discharging time constants are so selected in relation to the applied pulse width that the charging voltage progressively increases with repeated charging and discharging.

When the terminal voltage of the capacitor C3 exceeds a specific value, whereby the base potential of the transistor Tr4 by way of a resistor R14 becomes a value greater than the sum total value of the voltage drop $V_{BE}$ between the base and emitter of the transistor Tr4 and the voltage obtained by dividing the power voltage +B by means of resistors R15 and R16, the transistor Tr4 is rendered conductive.

When the transistor Tr4 thus becomes conductive, the transistor Tr3, of which the base is grounded by way of the resistor R4, the transistor Tr4, and a resistor R16, is rendered conductive. The conductive state of the transistor Tr3 causes a current to flow through a resistor R17, and the voltage generated across the terminals of the resistor R17 is fed back through a capacitor C4 and a resistor R18 and applied to the base of the transistor Tr4, which thereby is further held in its conductive state. The time period during which the transistors Tr4 and Tr3 are both placed in their conductive states is determined by the capacitor C4 and the resistors R18, R15 and R16 and is set at about 1.5 seconds in this embodiment. Therefore, at an output terminal 29 of the circuit X27, a signal *t* as shown in FIG. 4(F) is derived.

The signal *t* which is derived from the terminal 29 is supplied through the line *d* from the signalling and answering circuit X7 to the control holding circuit X10, which is thereby operated. Furthermore, the above mentioned signal *t* is applied to a message light holding circuit and a relay holding circuit (both not shown) which constitute a portion of the circuit X7, and both circuits are thereby operated. Therefore, each circuit respectively produces a signal through the lines *c* and *b,* whereby the lamp 23 and the relay 21 are operated.

According to the above described circuit organization, even in the case where the various call signals differ in their ratio of the high level period to the low level period, the output signal from the first control circuit X26 is always held constant, and the second control circuit X27 produces output signals at the moment when the output signal from the circuit repeats the high level and the low level for a predetermined number of times. Accordingly, among different telephone systems where the call signals are different, provided that the periods thereof are the same, the apparatus 10 assumes the answering state after the same number of rings of the call bell.

While in the case where the capacitor C12 and the resistor R10 are not provided in the first control circuit X26 of the above described embodiment, the output signal from the circuit X26 is determined by the signal shown in FIG. 4(C) and becomes a signal with a high-level period for about 0.8 second, and thereby the operation of the second control circuit X27 of the succeeding stage becomes unstable.

Moreover, according to the above described embodiment of the invention, the number of call signals required to operate the signalling and answering circuit X7 from the time of arrival of the call signal is set at two times. However, this number can be appropriately changed by adjusting the variable resistor VR1.

Furthermore, according to the apparatus organized as described hereinbefore in the case where the receiver is picked up before the apparatus changes over to the answering mode after the arrival of the call signal, the supply of the signal from the first control circuit X26 to the charging and discharging circuits comprising the capacitor C3, the resistors R12 and R13, and the variable resistor VR1 is terminated, whereby the charge in the capacitor C3 is discharged before the terminal voltage thereof reaches the value sufficient to render the transistor Tr4 of the second control circuit X27 conductive. Therefore, the apparatus 10 does not change over to the answering state, whereby the above described inconvenience is overcome. Furthermore, needless to say, in the case of arrival of the next call signal, the number of call signals required to convert the apparatus to the answering mode is the same number of call signals which is required in the normal automatic answering operation.

Moreover, in the above described embodiment of the invention, the transistors Tr1 through Tr4 are silicon transistors, and the diodes D1 through D3 are silicon diodes. The following list show the resistance values of the resistors R1 through R17 and the capacitance values of the capacitors C1 through C6 in the specific example described above. These values are set forth as illustrative only and are not intended to limit the scope of the invention.

| | | | | |
|---|---|---|---|---|
| Resistors: | | | | |
| | R1 | 2.7 kΩ | R10 | 33 kΩ |
| | R2 | 2.7 kΩ | R11 | 2.7 kΩ |
| | R3 | 2.7 kΩ | R12 | 10 kΩ |
| | R4 | 2.7 kΩ | R13 | 1 kΩ |
| | R5 | 1 kΩ | R14 | 22 kΩ |
| | R6 | 22 kΩ | R15 | 560 Ω |
| | R7 | 33 kΩ | R16 | 100 Ω |
| | R8 | 560 Ω | R17 | 1 kΩ |
| | R9 | 100 Ω | | |
| Capacitors: | | | | |
| | C1 | 33 μF | C4 | 33 μF |
| | C2 | 47 μF | C5 | 1 μF |
| | C3 | 220 μF | C6 | 1 μF |

Further, this invention is not limited to these embodiments but various variations and modifications may be made without departing from the scope and spirit of the invention.

What is claimed is:

1. In an automatic telephone answering apparatus coupled to a called side telephone set to operate cooperatively therewith and operating in response to the arrival of a call signal sent by a caller through a telephone line to send an answering message to the caller side, the combination of:

a first control circuit operating in response to a call signal which has arrived through a telephone line said signal being of the kind having the same recurrent period in which the duration of the ringing portion thereof may vary between different telephone systems to produce output pulses of the same period as those of said call signal and of a constant pulse width irrespective of the kind of call signal; and a second control circuit operating upon being supplied with a predetermined number of the pulses from the first control circuit to place the apparatus in the answering state of operation thereof by sending said answering message.

2. An automatic telephone answering apparatus as claimed in claim 1 in which the first control circuit comprises a differentiating circuit operating in response to the arrival of the call signal to produce an output signal including positive pulses and a pulse signal circuit operating in response to said positive pulses to produce as output pulse signals of a predetermined pulse width.

3. An automatic telephone answering apparatus as claimed in claim 2 in which the pulse signal circuit for producing pulse signals of a predetermined pulse width is a one-shot multivibrator triggered by the output signal of the differentiating circuit.

4. An automatic telephone answering apparatus as claimed in claim 1 in which the second control circuit comprises a charging and discharging circuit charged by the pulse signals from the first control circuit and discharging during the periods when the pulse signals are not applied thereto, and a circuit operating when the charging and discharging circuit has been charged to a predetermined voltage to place the apparatus in the answering state.

5. An automatic telephone answering apparatus as claimed in claim 4 in which the charging and discharging time constants of the charging and discharging circuit are so selected in relation to the pulse width of the pulse signals from the first control circuit that, as the pulse signals are successively applied to the charging and discharging circuit, which thereupon undergoes repeated charging and discharging, the charging voltage progressively increases.

6. An automatic telephone answering apparatus as claimed in claim 1 in which there is further provided cut off means for cutting off the arrival of the call signal with respect to the first control circuit when, during the operation of answering a call, the receiver of the called side telephone is lifted off its cradle thereby to close the telephone line for the apparatus, and the first control circuit is rendered inoperative by the cutting off of the arrival of the call signal by the cut off means and thereby does not permit the second control circuit to operate.

7. An automatic telephone answering apparatus as claimed in claim 4 in which there is further provided cut off means for cutting off the arrival of the call signal with respect to the first control circuit when, during the operation of answering a call, the receiver of the called side telephone is lifted off its cradle thereby to close the telephone line for the apparatus, and the first control circuit is rendered inoperative by the cutting off of the arrival of the call signal by the cut off means and does not produce pulse signals as output, whereby the charging and discharging circuit continues discharging and does not operate the second control circuit.

8. An automatic telephone answering apparatus as claimed in claim 4 in which the charging and discharging circuit further has charging time constant variable means which, by adjustment of the charging time constant thereof, adjusts the number of call signals required for operating the circuit for placing the apparatus in the answering state.

9. In automatic telephone answering apparatus coupled to called end of a telephone line to which a telephone set is attached and operating in response to the arrival of a recurring intermittant ringing signal on said line sent by a caller for a predetermined period and thereafter for transmitting an answering message to the caller if said telephone set has not been yet answered manually by a called party, the combination including:

a first control circuit coupled to respond to the arrival of a recurring intermittant ringing signal having a predetermined fixed period and a duration which may vary with different telephone systems to provide control pulses of the same period as said ringing signal and of a predetermined fixed pulse width; and a second control circuit connected to receive said control pulses for connecting said answering apparatus to said line and thereupon transmitting said answering message to said caller after receiving a predetermined number of said pulses in an uninterrupted series.

* * * * *